Figure 1:
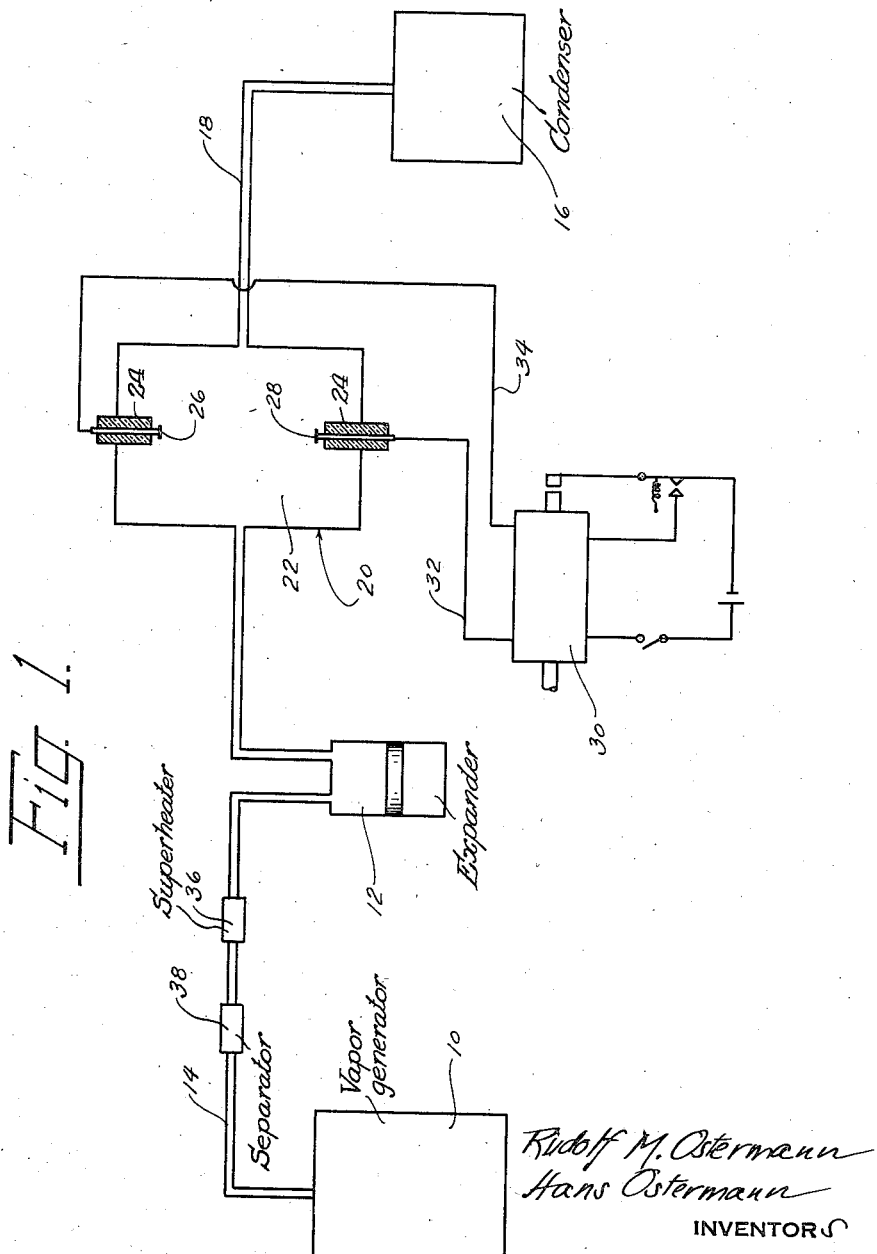

Sept. 24, 1935. R. M. OSTERMANN ET AL 2,015,364
METHOD OF AND APPARATUS FOR UTILIZING VAPOR
Filed Sept. 21, 1932 2 Sheets-Sheet 2

Rudolf M. Ostermann
Hans Ostermann
INVENTORS

BY O. V. Thiele
ATTORNEY

Patented Sept. 24, 1935

2,015,364

UNITED STATES PATENT OFFICE 2,015,364

METHOD OF AND APPARATUS FOR UTILIZING VAPOR

Rudolf M. Ostermann, Kenilworth, Ill., and Hans Ostermann, Munich, Germany, assignors to The Superheater Company, New York, N. Y.

Application September 21, 1932, Serial No. 634,194

4 Claims. (Cl. 103—264)

The present invention relates to the condensation of vapor after expansion.

Physicists have established the fact that vapor may be overcooled or super-saturated provided there are insufficient nuclei in such vapor to serve as points for originating condensation. This principle has been employed for making visible the paths of particles of electronic and atomic sizes by passing them when in a charged condition thru a super-saturated atmosphere, the paths of the particles being rendered visible by streaks of condensed vapor formed by their passage.

The present invention is based on our observation that the condensation in ordinary commercial apparatus is materially retarded over what is actually possible thru a supply of nuclei for condensation. Thus we have established experimentally that when saturated steam above atmospheric pressure has its phase altered by expansion to atmospheric pressure thru a nozzle, the visible cloud of condensation is immediately shifted from a point distant from the mouth of the nozzle to a point immediately adjacent to the latter when an electric field is set up in a glass bulb thru which the steam is passed on its way to the nozzle. Such shift, we conceive, is caused by an increase in speed of condensation due to the presence of ions in the vapor caused by said field, such ions serving as nuclei for condensation.

We have appended hereto broad claims to the method involved in said experiment. In order, however, that such method may be readily and clearly understood, we will now describe in detail, by way of example, and in connection with the accompanying drawings two given apparatuses selected from a large number adapted to carry out the method of our invention. In the drawings, Fig. 1 is a diagrammatic representation of an apparatus for expanding and condensing vapor and including means for ionizing such vapor.

Figure 2:
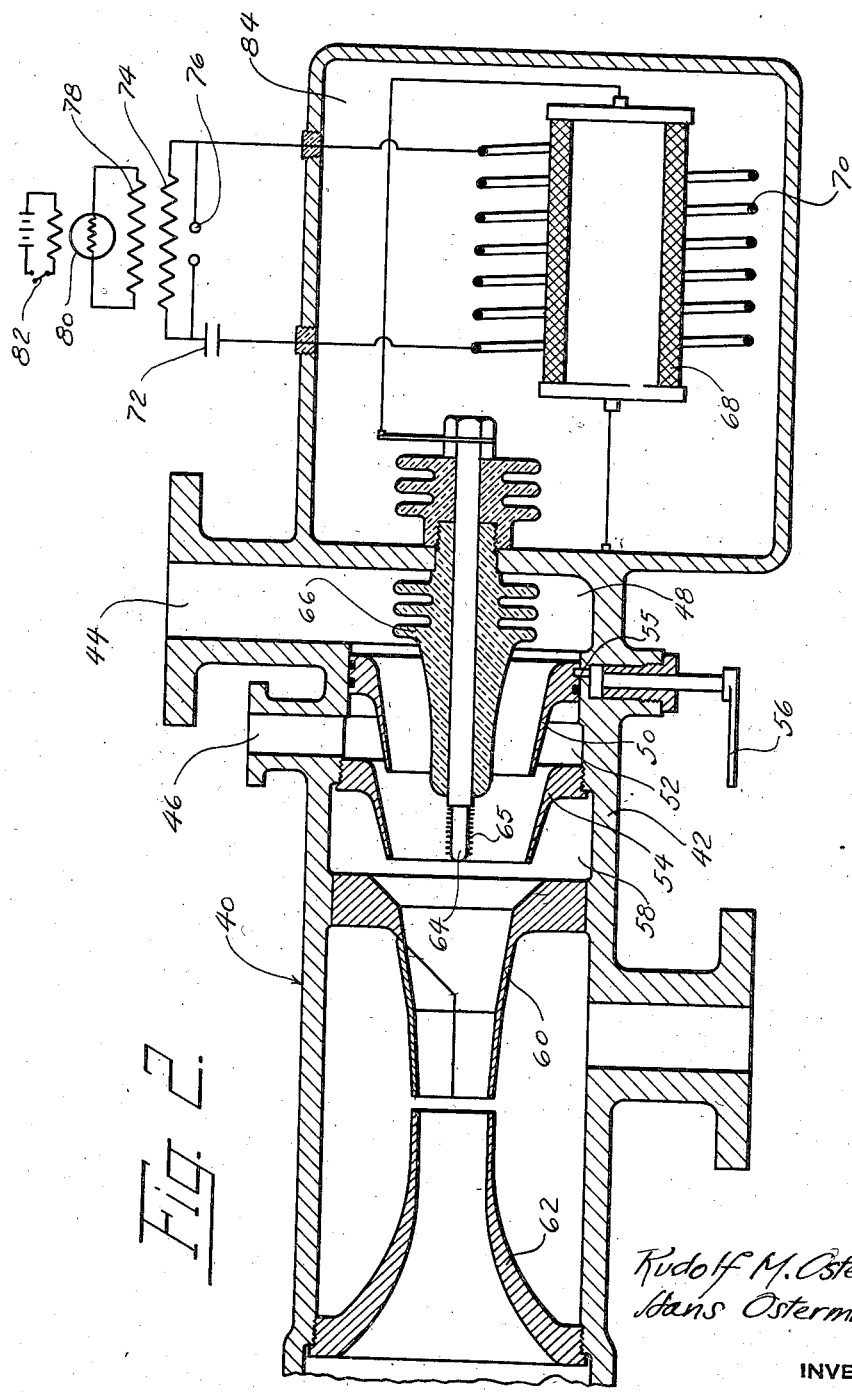

Fig. 2 is a sectional elevation of an injector having our invention applied thereto.

Referring to Fig. 1 of the drawings more in detail, 10 is a vapor generator connected to a vapor expanding means 12 by means of a conduit 14. From the expanding means 12, the expanded vapor is delivered to a condensing means 16 by means of a conduit 18. Intermediate the generator 10 and the condenser 16, we place, in accordance with our invention, an ionizing means 20. The drawings show the ionizing means 20 connected into the line 18 between expanding means 12 and the condensing means 16. However, we do not limit ourselves to this, as the ionizing means 20 may be placed in the line 14 if desired. The ionizing means 20 comprises a chamber 22 in the wall of which are a pair of insulators 24, 24 thru which extend electrode members 26 and 28 of opposite polarity. Electrodes 26 and 28 are in contact with vapor flowing thru the chamber 22 on its way to the condenser 16 and are maintained at such electrical potentials as to produce a large number of electrically charged particles or ions in the vapor stream. For this purpose, we have illustrated an ordinary high frequency coil 30 connected to the electrodes 26 and 28 by leads 32 and 34 respectively. The source of current for the electrodes 26 and 28, however, need not necessarily be alternating. As shown, the coil 30 is of the ordinary make and break induction type with a continuous current source of energy, but such showing will be understood as being diagrammatic.

In the majority of cases our invention will be applied to the expansion and condensation of steam, in which case the vapor generator 10 will be an ordinary steam boiler. We find, moreover, that our invention has particular value in situations where the vapor enters the condensing apparatus in somewhat superheated condition. Certain classes of apparatus utilizing superheated steam frequently produces such a condition. We have, therefore, indicated diagrammatically in the line 14 a superheater 36. A separator 38 may also be included in line 14, but we do not limit ourselves to the use either of a superheater or a separator.

The expanding means 12 may be the cylinder of a piston type prime mover or the nozzle of a turbine, or other jet using device, such as an injector.

Referring more particularly to Fig. 2 in which we have illustrated the application of our invention to injectors, an injector is indicated in general by reference character 40. Injector 40 has a casing 42, a steam inlet 44, and a water inlet 46. Steam inlet 44 delivers into a steam chamber 48 from which steam flows during the operation of the device thru a steam nozzle 50. Water inlet 46 discharges into water chamber 52 from which the water flows thru nozzle 54 forming part of the means of the apparatus for combining the water and steam. The end of the nozzle 50 is shown as projecting into the mouth and nearly to the outlet end of the nozzle 54, this is a matter of choice, however. Preferably the nozzle 50 is movable by a known pin and slot arrangement 55, operated by the lever 56 to vary the amount of water which can flow from chamber 52 thru nozzle 54. However, we do not limit ourselves to this. As illustrated, nozzle 54 is surrounded by a vacuum chamber 58 and the discharge end of nozzle 54 lies adjacent to the mouth of a combining nozzle 60 of ordinary type having an overflow associated therewith in the usual manner. The nozzle 60 is arranged to deliver into the discharge nozzle 62. If desired nozzles 54 and 60 may be combined and the chamber 58 omitted. However, we do not limit ourselves either to the form of construction having such chamber or to the one without it.

In accordance with our invention, means are provided for ionizing the steam delivered thru nozzle 50. The arrangement illustrated for this purpose comprises an electrode 64 arranged coaxially with nozzles 50 and 54 and supported by an insulator 66 so that it may discharge into the stream of gas delivered thru nozzle 50. Preferably the electrode 64 has points 65 thereon to facilitate the electrical discharge therefrom. As shown, moreover, electrode 64 projects well into the nozzle 54. However, we do not limit ourselves to this. The means illustrated for energizing electrode 64 comprises a Tesla apparatus which includes a high frequency coil 68 surrounded by and energized from a Tesla coil 70. Coil 70 is energized by the current of the condenser 72 which is alternately charged and discharged by the secondary coil 74 and spark gap 76. The coil 74 is shown in inductive relation to the primary coil 78 which is in the circuit of an alternating supply 80. The exciting circuit for the alternator 80 is shown as having a switch 82 therein by which the production of oscillations in coil 68 may be started and stopped when desired. The electrode 64 is connected to one pole of the coil 68, the other pole of which is connected to the casing 42. The coil 68 is shown as mounted in a chamber 84 and the electrode 64 is preferably extended thru the wall of chamber 84 to facilitate its connection with coil 68.

The advantage of ionizing steam used in an injector will be clear from the following considerations: When steam expands by issuance from a nozzle into a realm of lower pressure, and when part of its heat energy is thereby converted into kinetic energy, it, of course, loses heat, and when this heat loss is so great that the heat which remains in the steam, corresponds to a wet condition, the expanded steam should be moist in order to be in thermal equalization. Actually, there is a time lag between the moment of expansion and the formation of moisture, and the steam is undercooled. The under-cooled steam moving with high velocity and hitting the water, effects an elastic shock, and during that shock it is recompressed, i. e. part of its kinetic energy is reconverted into heat which is in turn absorbed by the water. Ionization eliminates the time lag, the steam becomes moist immediately upon expansion, the shock becomes less elastic, and less kinetic energy is reconverted into heat. More kinetic energy of the steam is thus imparted as such to the water.

While we do not limit ourselves to any particular form of apparatus for supplying the electricity to ionize the steam flow for an injector, it is desirable that such source of electricity be not dangerous to the persons operating the injector. We, therefore, have illustrated a Tesla apparatus for ionizing because such apparatus is adapted to supply currents for such purpose of the necessary voltage but at such high frequency that they are not dangerous.

What we claim is:

1. In the method which comprises expanding vapor in a nozzle and condensing it by direct contact with fluid, the step of ionizing said vapor upon expansion for causing it to condense within a shorter zone in the direction of flow than would be the case without said ionization.

2. In the method which comprises expanding vapor in a nozzle and condensing it by contact with fluid, the step comprising ionizing said vapor before contacting it with fluid.

3. The combination with the water supply and the water and steam combining means of an injector of a steam nozzle for delivering steam thru said means and means for ionizing steam delivered by said nozzle.

4. The combination as set forth in claim 3, and in which the ionizing means includes an electrode arranged within the combining means and coaxial with the steam nozzle.

RUDOLF M. OSTERMANN.
HANS OSTERMANN.